United States Patent
Dutta et al.

(10) Patent No.: US 12,487,439 B2
(45) Date of Patent: Dec. 2, 2025

(54) LENS LESS IMAGING MICROSCOPY SYSTEM

(71) Applicant: TECHNOCULTURE RESEARCH PRIVATE LIMITED, Bihar (IN)

(72) Inventors: Pritam Dutta, West Bengal (IN); Satyam, Bihar (IN)

(73) Assignee: TECHNOCULTURE RESEARCH PRIVATE LIMITED, Bihar (IN)

( * ) Notice: Subject to any disclaimer, the term of this patent is extended or adjusted under 35 U.S.C. 154(b) by 845 days.

(21) Appl. No.: 17/729,572

(22) Filed: Apr. 26, 2022

(65) Prior Publication Data

US 2022/0350128 A1    Nov. 3, 2022

(30) Foreign Application Priority Data

Apr. 30, 2021 (IN) .............................. 202131019937

(51) Int. Cl.
| | | |
|---|---|---|
| *G02B 21/36* | (2006.01) | |
| *G02B 21/06* | (2006.01) | |
| *G02B 21/24* | (2006.01) | |

(52) U.S. Cl.
CPC ........... *G02B 21/361* (2013.01); *G02B 21/06* (2013.01); *G02B 21/24* (2013.01); *G02B 21/362* (2013.01)

(58) Field of Classification Search
CPC ...... G02B 21/361; G02B 21/06; G02B 21/24; G02B 21/362
See application file for complete search history.

(56) References Cited

U.S. PATENT DOCUMENTS

| 10,706,258 B2 | 7/2020 | Javidi et al. | |
|---|---|---|---|
| 2005/0029467 A1 | 2/2005 | Yu et al. | |
| 2009/0322870 A1* | 12/2009 | Fujiki | G02B 21/367 |
| | | | 348/79 |
| 2011/0092762 A1* | 4/2011 | Wong | G06T 7/0012 |
| | | | 435/6.1 |
| 2013/0217064 A1* | 8/2013 | Robitzki | C12M 33/08 |
| | | | 435/287.1 |

(Continued)

FOREIGN PATENT DOCUMENTS

| IN | 202131009815 A | 4/2021 |
|---|---|---|
| JP | 2021515910 A | 6/2021 |

(Continued)

OTHER PUBLICATIONS

First Examination Report in IN202131019937 dated Aug. 18, 2021, 6 pages.

*Primary Examiner* — James T Boylan
(74) *Attorney, Agent, or Firm* — Rothwell, Figg, Ernst & Manbeck, P.C.

(57) ABSTRACT

An arrangement of a lens less imaging microscopy system having an antimicrobial and anti-bacterial surface. The system provides a modular layout, i.e., having exchangeable or interchangeable modules along with autoclave ability of individual modules. The lens less imaging system may include a light engine module, sample containing specific module, camera module, chip dock module that are swappable, respectively. The lens less imaging system may also include a software module that allows recognition of attachments and detachments of the various modules. The lens less imaging system has higher flexibility and affordability due to the swappable modules.

17 Claims, 11 Drawing Sheets

(56) References Cited

U.S. PATENT DOCUMENTS

| | | | |
|---|---|---|---|
| 2015/0150646 A1* | 6/2015 | Pryor | G06F 3/0354 |
| | | | 345/184 |
| 2015/0374868 A1* | 12/2015 | Bruce | A61L 2/28 |
| | | | 422/119 |
| 2016/0266362 A1* | 9/2016 | Kapanidis | G02B 21/0088 |
| 2018/0143418 A1* | 5/2018 | Kapanidis | G02B 21/26 |
| 2021/0063714 A1 | 3/2021 | Fahrbach et al. | |

FOREIGN PATENT DOCUMENTS

| | | |
|---|---|---|
| KR | 100849767 B1 | 7/2008 |
| WO | 2020014188 A1 | 1/2020 |

* cited by examiner

LENS LESS IMAGING MICROSCOPY SYSTEM

CROSS REFERENCE TO RELATED APPLICATION

This application claims the benefit of Indian Patent Application number 202131019937 filed on Apr. 30, 2021, the disclosure of which is incorporated herein in its entirety by reference.

FIELD OF THE INVENTION

The present invention relates to an arrangement of a lens less imaging microscopy system having an antimicrobial and anti-bacterial surface. Particularly, the present invention provides modular and autoclavable arrangement of the lens less imaging systems utilized for imaging and analysis of biological micro particles such as cells, organelles, cellular particles etc. placed in any kind of sterile conditions for e.g. incubator.

BACKGROUND OF THE INVENTION

The conventional methods include different forms of interchangeability in Microscopes. Such as, interchangeability achieved through the threading used for attachment and detachment of objective lenses used in an upright microscope, inverted microscope, stereo microscope, and other similar microscopy systems. Further similar forms of interchangeability exist in imaging systems as a whole such as in the case of cameras with changeable lenses produce a similar form of modularity through the use of threaded or similar mechanical connections. There is also precedence in the use of electric contacts for the transmission of electronic signals through such threaded connections such as in the case of digitally controlled focusing mechanisms present in auto-focus lenses. There are other scenarios where very specific forms of interchangeability and extend ability are made available to users such as in the case of optical systems incorporating optical extenders, mirrors, and other mechanisms intended for bringing adaptability and interchangeability to imaging systems. Despite these methods being available, microscopes that are intended for use within an aseptic condition such as that of a $CO_2$ incubator appears to be lacking in a solution for a device to operate with high utility in the environment of a $CO_2$ incubator.

A device intended for long-term utilization within a $CO_2$ incubator involved in culturing of animal and plant cell lines should be designed to have some specific properties which are not required in other microscopy scenarios. The particular scenario of cell culturing within $CO_2$ incubators demands microscopy systems that are compact so that the space within a $CO_2$ incubator can be utilized judicially.

Further, the Cell culture labs require a proper setup for sterilization. Even a very small degree of contamination from bacterial, viral, micro-bacterial and other microorganisms sources can produce a devastating result for the lab. This has hence led to the use of incubators of various forms that are mounted at top of the microscope itself. Such configuration of incubators mounted on the top of microscopes completely circumvent the need to solve the problems stated above. However, this configuration has the following major disadvantages:

It requires a specialized microscopy setup which requires substantial space in a lab;
It is an expensive setup;

Finally, the most important limitation of this system is that when it comes to incubator utilization only one flask or container of cells can be mounted on the imaging setup at a time. Though various such setups utilize multi-well plates in order to host a number of independent cell cultures in different wells of a plate. However, these systems provide imaging one after the other in a sequential process. Methods utilizing multi-well plates cannot be imaged all at the same time in parallel as well as be limited in their capacity to culture cells of different kinds due to challenges associated with cross contamination.

There are other solutions whereby a conventional microscope intended for cellular observation is placed as a whole or in part within the incubator chamber. This method shares some of the disadvantages to incubators mounted on microscopes. There are also additional disadvantages brought upon by this configuration specifically that the use of optical systems within a conventional microscope makes it challenging and error-prone, if not futile to conduct autoclave sterilization of the microscopy system. The presence of various geometrical features, joints, bolted connections, and other such niches represent areas where contamination can harbor over time making it difficult to maintain sterility with high confidence for a long period of time within the sterile environment of a $CO_2$ incubator.

Furthermore, the forms of modularity present in conventional imaging systems produce their utility through the definition and placement of such interfaces where interchangeability of modules of either side represents high values to their users. In the case of microscopy within an autoclavable device, the value of modularity comes from users being able to use various modules for the production of light, control of the sample environment and the nature of the detection system being used. The utility here comes from a proliferation of configuration that these trusted incubator-friendly components can be arranged in order to produce a large and open extension set of supported experimental scenarios. For example, a user might move from cell viability assays to assays on wound healing abilities of candidate medication compounds. This can be achieved by simply changing the sample holding module to one that is designed for the generation of thermal and scratch wounds. Similarly, one might move to fluorescence-based assays simply through the use of an appropriate detector containing a fluorescence filter. This form of modularity depends on modules that are closed for modification but open to extension.

There are problems however in bringing this level of adaptability to a system designed to be autoclaved as each joint and each geometrical feature on the surface of the modules may represent a micro-niche for contamination as well as an entry point for pressurized hot steam during the process of autoclaving.

Along with achieving modularity another problem of the conventional microscope in an incubator environment is that it disrupts the conventional mode of usage of a $CO_2$ incubator. It is common for a $CO_2$ incubator to be used for a small to a large set of cell culture flasks in a single $CO_2$ incubator. This practice does not have a counterpart in incubator microscopy. Both incubators mounted on microscopes as well as microscopes placed within incubators tend to support usually one single flask to be observed at a time or in some cases to a small number.

Furthermore, if there is a breach through any of these joints even if they are microscopic in dimension, the leak would damage and bring unreliability to the outputs of the microscope. Hence it is essential for the microscope to not only be able to withstand the high temperature and pressure of an autoclave environment but also to be able to detect even the smallest forms of leakage in order to warn the user instead of continuing to function in a manner that is prone to undefined behavior.

The autoclave is a process used for sterilization of equipment in the lab. This sterilization method is the most trusted form of sterilization and hence is commonplace as the go-to strategy in cell culture lab, plant tissue culture lab, and so on, etc. The reason for the potency of the sterilization method is that it utilizes very high pressure hot steam. This high-pressure hot steam kills any bacteria or virus that might be present on the outer surface of any equipment or apparatuses.

This conventional process is not feasible with electronic devices as any device that has electronic components if placed inside on an autoclave system will have to withstand the high-pressure hot steam. Further, if the steam reaches electronic components it can obliterate the circuit of the electronic component. Additionally, it can also damage the optical system as the steam entering inside the optical system creates a frosting that might never leave the optical system.

Hence autoclave presents a dual challenge for a microscope which consists of both optical as well as electronic components. Nearly all microscopes have inside electronic circuitry connected with the computer. It is common for microscopes to require electronic connections with a computer, electronic sources of power and other peripherals. This connection can be wireless however that would be difficult as the microscope needs to be placed inside of an incubator and usually it does not support any wireless signal connection outside of the incubator. Wireless communication presents some challenges for the environment of an incubator as most incubators use metal enclosure—acting in effect as Faraday Cages—making various forms of wireless communication difficult to achieve reliably if achievable at all.

Further the wired connection must be completely sealed such that it can even withstand high-pressure conditions. A wired connection furthermore is made complicated by its relationship to the electronic circuits within the enclosure of a microscope. If there is such a direct connection—this can present challenges to both leak safety of the product under high steam pressure as well as ability of the wiring material to withstand frequent and many cycles of high temperature and pressure of the autoclave process.

If the material used for sealing even has a small degree of porosity, small molecules or gases might be able to pass through them such as oxygen and carbon dioxide. In such a case, steam would still be able to pass through the system which is completely sealed with epoxy. Therefore, it shows that the material used for the construction of the microscope must be ensured to have very low surface porosity.

Designing and fabricating an autoclave-able device may be complicated. First of all, the number of parts in the module needs to be minimized. Such an instrument will need also able to handle UV decontamination. All components should be capable of handling high temperature (up to 180° C.). Humidity and pressure need to remain as close as possible as constant irrespective of whether they are autoclavable currently or not. Such an instrument also needs to be designed for worst-case scenarios after ripened usage over a long period an instrument might show some leakage.

During operation, the camera sensor gets heated up to high temperatures. This high temperature is unnoticeable in camera systems with lenses as they are at a distance with their subject/s. However, in a lens-less microscope, the subject is placed right on top of the camera sensor. The heat generated from the sensor can in this case cause humidification or/and fogging of the sample container. This fogging can scatter the incoming coherent rays and make the lens-less imaging modality non-functional. The heating issue is conventionally mitigated using active heat dissipation facilitated by a fan or a cooling agent. These methods demerit for their need for air circulation which might require openings that cannot be facilitated here.

Further, if the material used has even a small degree of porosity also adhesives normally have some amount of porosity in them which might be between micro porous and Nano-porous. Either of those cases small molecules or gases might be able to pass through them such as oxygen and carbon dioxide. In such a case steam would still be able to pass through the system which is completely sealed with epoxy which means a mine full choice is necessary. This also means the material we use for the construction of this microscope must be ensured to have very low surface porosity.

In view of the above problems there is a need for an ideal microscope that would be compact enough to allow the same number of flasks to be placed on a microscope within the incubator that could also be placed in a $CO_2$ incubator without the disruption of the microscopy setups. Further, the instrument in the system should be able to withstand a wide range of decontamination protocols such as UV decontamination, and decontamination based upon alcoholic and acidic solvents. All the components used to build the internals of such a microscope as well as the externally exposed components must be able to withstand high temperature (up to 180° C.), high humidity and vapor pressure and should remain sealed irrespective of whether they are placed within an autoclave or not. Further an instrument should be designed for any scenario ensuring high reliability in spite of being used for a long period.

OBJECTIVE OF THE INVENTION

The primary objective of the present invention is to provide a lens less imaging system which is small in size and can be autoclaved in order to operate highly reliably within the sterile environment of a $CO_2$ incubator.

Yet another objective of the present invention is to provide a lens less imaging system which is a unibody structure and operates reliably within a sterile environment.

Another objective of the present invention is to provide a lens less imaging system for long duration imaging of cells, microorganisms, and other micro metric artifacts within a sterile environment.

Yet another objective of the present invention is to provide a lens less imaging system where the whole assembly is autoclavable and hence can withstand many and frequent application of hot pressurized steam.

Another objective of the present invention is to provide a lens less imaging system with anti-microbial & anti-bacterial external surface in order to aid higher levels of reliability within a sterile environment.

Yet another objective of the present invention is to provide a lens less imaging system which does not alter the ambient temperature of the environment it is kept in, by emitting heat during long duration image analysis of application.

Another objective of the present invention is to provide an economical lens less imaging system as compared to conventional live microscopy approaches.

Another objective of the present invention is to provide a lens less imaging system to achieve detach-ability between the modules for multiple applications.

Yet another objective of the present invention is to provide software based identification and validation of instrument configurations after insertion or removal of modules.

Yet another objective of the present invention is to provide an affordable lens less imaging instrument that is flexible and reliable to handle.

Another objective of the present invention is to provide means to increase flexibility in operation of lens less imaging instrument.

Yet another objective of the present invention is to design a module that provides a reliable and compact system that does not utilize any moving parts inside of the system.

Other objectives and advantages of the present invention will become apparent from the following description taken in connection with the accompanying drawings, wherein, by way of illustration and example, the aspects of the present invention are disclosed.

BRIEF DESCRIPTION OF DRAWINGS

The present invention will be better understood after reading the following detailed description of the presently preferred aspects thereof with reference to the appended drawings, in which the features, other aspects and advantages of certain exemplary embodiments of the invention will be more apparent from the accompanying drawing in which.

SUMMARY OF THE INVENTION

Figure 1:
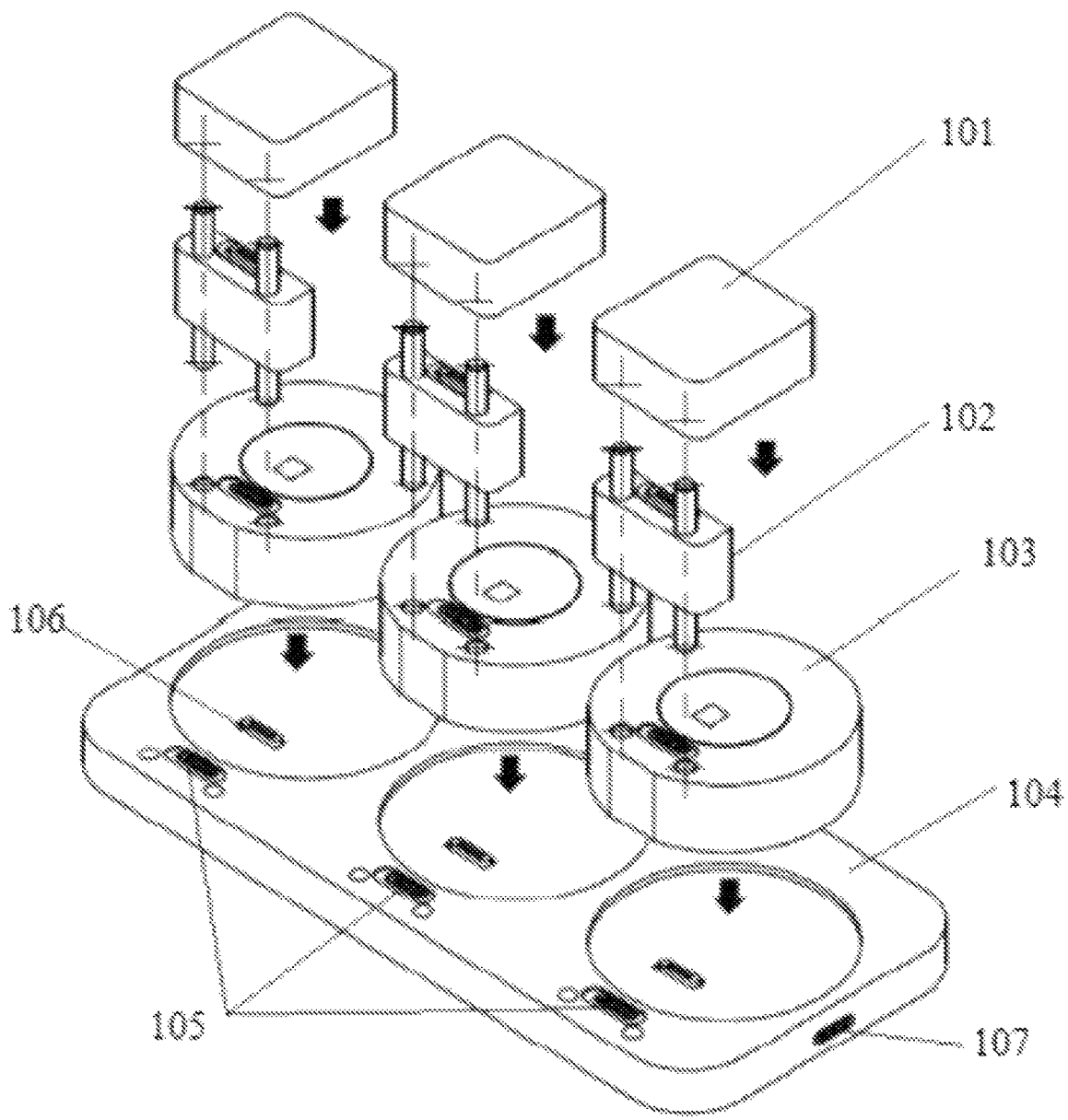
FIG. 1 illustrates perspective view of connection of all modules of the system.

The present invention relates to a lens less imaging microscopy system having a modular design, i.e., the system provides exchangeable or interchangeable modules. The system also provides individual modules with anti-microbial & anti-bacterial external surface. The present system sets new benchmarks for ease of use, reliability, and affordability. The layout of present lens less imaging system primarily focuses on simplicity of the instrument, low cost, easy to handle, autoclave-able ability, and most importantly being modular. The present lens less imaging system is especially designed and optimized for three dimensional microscopies of cells, microorganisms, and other micro metric artifacts within a sterile environment with unprecedented ease, reliability, and affordability.

DETAILED DESCRIPTION OF INVENTION

The following detailed description and embodiments set forth herein below are merely exemplary out of the wide variety and arrangement of instructions which can be employed with the present invention. The present invention may be embodied in other specific forms without departing from the essential characteristics thereof. All the features disclosed in this specification may be replaced by similar other or alternative features performing similar or same or equivalent purposes. Thus, unless expressly stated otherwise, they all are within the scope of the present invention.

Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings but are merely used to enable a clear and consistent understanding of the invention. Accordingly, it should be apparent to those skilled in the art that the following description of exemplary embodiments of the present invention are provided for illustration purpose only and not for the purpose of limiting the invention.

It is to be understood that the singular forms "a," "an," and "the" include plural referents unless the context clearly dictates otherwise.

It should be emphasized that the term "comprises/comprising" when used in this specification is taken to specify the presence of stated features, integers, steps, or components but does not preclude the presence or addition of one or more other features, integers, steps, components, or groups thereof.

As per an embodiment the present invention provides a compact lens less imaging microscopy system which operates efficiently within a sterile environment. This system has a modular design, i.e., it has an exchangeable or interchangeable module. The lens less imaging system primarily includes, but is not limited to, a light engine module, a sample container specific module, and a camera module that are swappable.

The present lens less imaging system is especially designed and optimized for two dimensional and three dimensional microscopy of cells, microorganisms and other micro metric artifacts within a sterile environment with unprecedented ease, reliability, and affordability. The lens less imaging system primarily focuses on autoclave ability of each individual module for ensuring nearly zero contamination while operating and high reliably within a sterile environment. Further it provides an anti-microbial & anti-bacterial external surface in order to aid higher levels of reliability within a sterile environment.

In the traditional lens less imaging system a normal led based single wavelength light source is used however in that present invention light engine is based upon a modern and a chromatically precise LED with coherent light source generator producing different wavelength for individual module. The said light engine, therefore, does not require high frequent calibration, saving users great amount of time and hassle. Further, traditional lens less imaging system utilizes a fixed sample size to be used for microscopy whereas in the present invention sample container specific module is placed for overcoming the limitation with respect to the sample size for microscopy. Further, without use of any Fan or any active cooling the temperature of the camera sensor is maintained well below the temperature inside in an incubator using a specialized power management circuitry. The present lens less imaging system also has higher flexibility and affordability due to the swappable modules. The present system also analyses and provides solution to all the data, security and complexity concerns arising in the system.

In chip scope of the present invention, high-temperature, UV inert, polymer-based thermoset epoxy for the sealing of module components is utilized. This type of epoxy can resist up to 180° C. temperature and does not denature during UV exposure UV-A, UV-B and UV-C—each on a frequent and repeating basis for a long period of time and does not change its any physical properties. The technique of epoxy casting and sealing is mostly followed and implemented by creating a thick layer and increasing the area of contact. After the curing process, the polymer seals are tested using the internally present barometer ensuring successful sealing has been achieved without presence of porosity. After solidification, this polymer does not have porosity in it, for that reason gases cannot pass through on that. In fact, during autoclave hot steam also cannot pass through on to that sealing.

Further a special type of magnetic Pogo pin-based connector are used for maintaining the sealing. These pins are made of thermoset plastic significantly which improve the material's mechanical properties, providing enhanced chemical resistance, heat resistance, and structural integrity. Thermoset plastics are often used for sealed products due to their resistance to deformation. Electrical contacts pins are made of brass metal and also gold plated to avoid rusting. These over-molded pieces have no physical gaps present between electrical contact pins and the plastic body. For that reason, it provides proper sealing. The same epoxy sealing strategy is used for mounting those connectors for each module. This type of connector can resist up to 180° C. temperature and does not change its physical properties. While inside of the incubator one special wire comes out on that which connects the chip scope modules with external accessories or UI modules are connected for power supply. The insulation material of that wire is made of high temperature resistive thermoplastic and capable to maintain physical properties during autoclave.

A singular group of well encapsulated wires form the single point of connection between the microscope and the user driven devices such as GUI modules and computers—this singular group of wires incorporate both the data communication as well as power transmission. The insulation material of this singular group of wires is made out of a material capable of resisting high-temperature and can also be made out of a thermoplastic. This wire as with the rest of this microscopy setup must be capable of maintaining its physical integrity and surface properties despite frequent and repeated autoclave and other decontamination procedure applied to it.

Further the same epoxy sealing strategy is used for mounting those connectors on both sides of the wire which connect with the chip scope module base. For that minimalist design approach thread holes, corners, unwanted edges, and the number of individual parts is minimized and separated in individual modules so that the modules become autoclave friendly. Screws are used in some places. These are tightened with thread locking compound and elastomeric high-temperature thermoplastic gaskets. Using this type of gaskets, it provides tightened sealing where gases and small molecule does not pass through into that. For eliminating the material porosity some surface treatment is applied on each module part. For that example, in the case of aluminum, an anodizing surface is provided.

Furthermore, anti-microbial and anti-bacterial surface treatments are provided on each module surfaces. That surface treatment approach is significantly increasing the reliability of the modules. In chip scope, high temperature resists thermoplastic elastomeric gaskets on the light engine module for eliminating frosting of glass. This type of gaskets is placed between two parts with a high-pressure sealing. This type of gaskets can resist up to 180° C. temperature and does not change its physical properties. Therefore, the reliability of the modules is significantly increased. In the last layer of safety, silica gel beads container bags for de-humidification inside of the modules are provided and which also prevent frosting to protect the electronics circuits and coherent light path.

The temperature compatible system modules also include pressure, humidity, or temperature sensor. So that intelligent sensing for the failure of module sealing system can figure out during operation and testing of the modules. Also, it provides the guidelines for maintenance through UI. In the present invention sensor's ability to cool off rapidly on its own when it is powered down is utilized. This allows the sensor to not gain heat over a long period of idleness between multiple images captures within a time-lapse imaging scenario. During the taking of an image is the only time the camera sensor turns ON. After the image has been taken the sensor is instantly powered OFF. For that reason, the sensor does not heat up and we can maintain a reasonably low peak temperature as well as a significantly lower average temperature.

The method incorporated herein for the working of the system of the present invention describes the need for mitigating the cooling mechanism without disrupting the sealing requirements of the system. The method utilizes the ability of the camera sensor to cool off rapidly on its own while it is physically disconnected from its power source. Further, imaging sensors used within the device are able to cool down to a temperature i.e., 30° C. within a few seconds of physical disconnection from the power source. This allows the microscope to cycle through a process of capturing an image, going through a disconnection process, followed by waiting for the duration set by the user between two subsequent frames and re-connect just in time in order to be ready to capture the next image in time. This allows the sensor to not gain and dissipate heat over the period of idleness between two subsequent images captured within a time-lapse imaging scenario.

Particularly, the method of the present invention includes switching ON the camera sensor just before capturing the next frame. Once the image has been captured the sensor is instantly switched OFF. This causes the sensor to remain cool due to the regular supply of power even in its idle mode. This mechanism is capable of maintaining a reasonably low peak temperature of less than 30° C. which may vary slightly amongst various different sensors. This power on and off mechanism is most effective when carried out through a specialized circuit which is able to switch the power lines on and off associated to the camera sensor.

The unibody design minimizes the mating parts and makes external surface as smooth as possible with minimal features so as to
- minimize micro niches;
- minimize clotting of microorganism;
- enhancing cleanability and serializability of the product;
- no tolerance pigments or paint in order to produce an external surface that would last long in time without developing surface defects.

As per an embodiment FIG. 1 illustrates connection of all modules of the system including plurality of light engine module (101), plurality of sample containing specific module (102), plurality of camera module (103), chip dock module (104), plurality of external power module pogo pin connector (105) for different light engine modules (101), a plurality of male camera module chip dock pogo pin-based connector (106), and a main chip dock female pogo pin based connector (107). The sample containing specific module (102) provides high power supply for the light engine module (101) as per requirement. The male camera module with chip dock pogo pin-based connector (106) connects and supplies power and signal to plurality of camera module (103). The main chip dock female pogo pin based connector (107) for supplying power and the signal is placed in the chip dock (104).

In the present invention an aperture for the system is fabricated using microfabrication technique in combination of metal deposition method preferably either a DC Sputtering, a RF sputtering, an electro deposition, or an electro-less deposition over thin film of rigid substrate such as but not limited to fused silica, borosilicate, etc. The said microfabrication technique on glass acts like a window as well as additional layer of blockage against the vapor which is produced while autoclaving. This technique also prevents deformation and blockage during high temperature and high vapor pressure formation at the time of working of the system.

Figure 2:
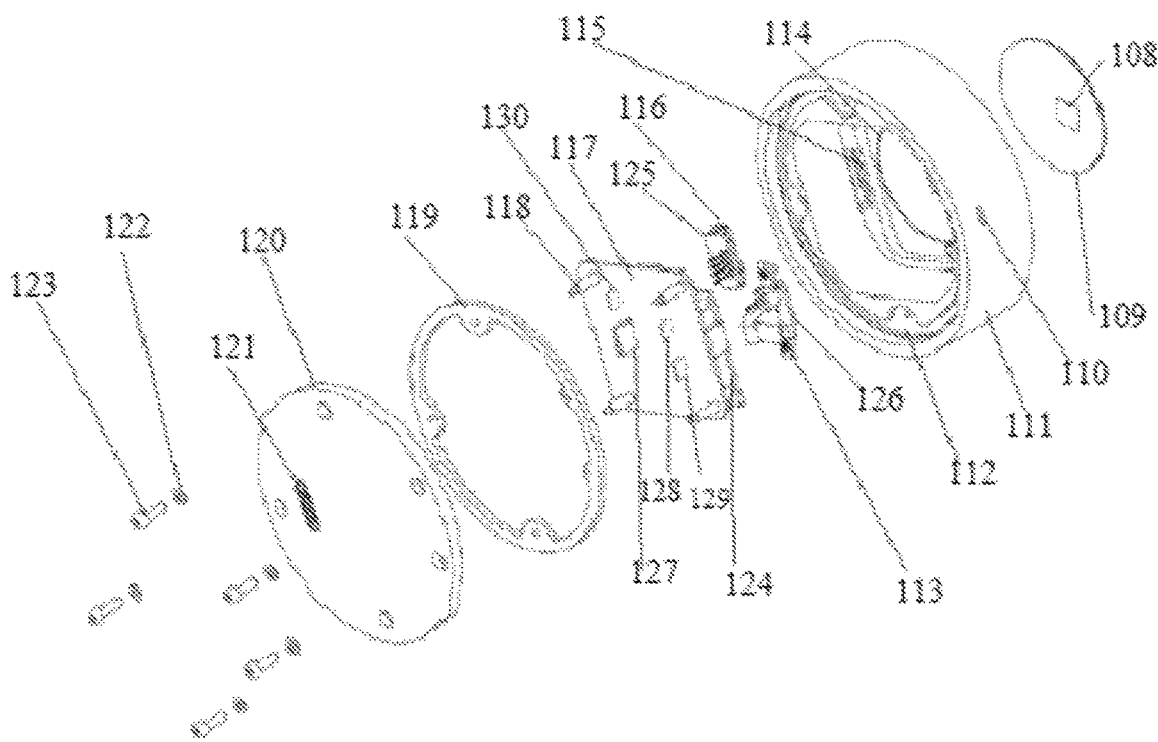
FIG. 2 illustrates exploded view of the camera module.

As per an embodiment FIG. 2 illustrates exploded view of the camera module (103). The camera module (103) comprises an anti-microbial and anti-bacterial surface-treated camera housing (111), a scratchproof viewing glass (109) with a sensor viewing window (108). The scratch-proof viewing glass (109) is placed in the camera module opening window (114) with help of bulk thermoset epoxy seals and epoxy dams at mating points. A process indication light window (110) where process light indication pipe (113) is placed with the use of bulk a thermoset epoxy seals and epoxy dams at mating points. The said process light indicator pipe (113) carries the light source and displays RGB lighting notification indicating the module status while in operation, through RGB led light source (131) placed in the process light indication PCB (126). Further this process light indication pipe (113) is connected with process light indication PCB (126). A female 4 pin pogo pin (116) is placed on an opening (115) where a sample containing a specific module (102) is being connected and sealed with the use of bulk thermoset epoxy seals and epoxy dams at mating points. This female 4 pin pogo pin (116) is placed on a pogo pin PCB (125). Further, a pogo pin PCB (125) and process light indication printed circuit board (PCB) (126) will be connected while completing the assembly of the camera module (103) to mother PCB (117) with a plurality of electrical connectors.

The system further includes a plurality of sensors having at least one camera sensor (124), at least one humidity sensor (128), at least one temperature sensor (129), and at least one barometric sensor (130) is placed on the mother PCB (117). A plurality of mother PCB electrical connector (127) is placed in mother PCB (117) for the supply of power and signal from a female Camera module chip dock Pogo pin-based connector (121) placed in camera module backplate sealing plate (120). The mother PCB (117) is positional connected with the camera module backplate sealing plate (120) with help of a plurality of PCB spacers (118). An elastomeric high-temperature thermoplastic gasket (119) is placed in the camera module gasket slot (112) while rigid sealing of the camera module backplate sealing plate (120) with help of plurality of rustproof camera module backplate sealing plate bolts (123) and rustproof camera module backplate sealing plate washers (122). Furthermore, a thread locking compound is used for inert leakage proof sealing and tightening of the plurality of rustproof camera module backplate sealing plate bolts (123).

Figure 3:
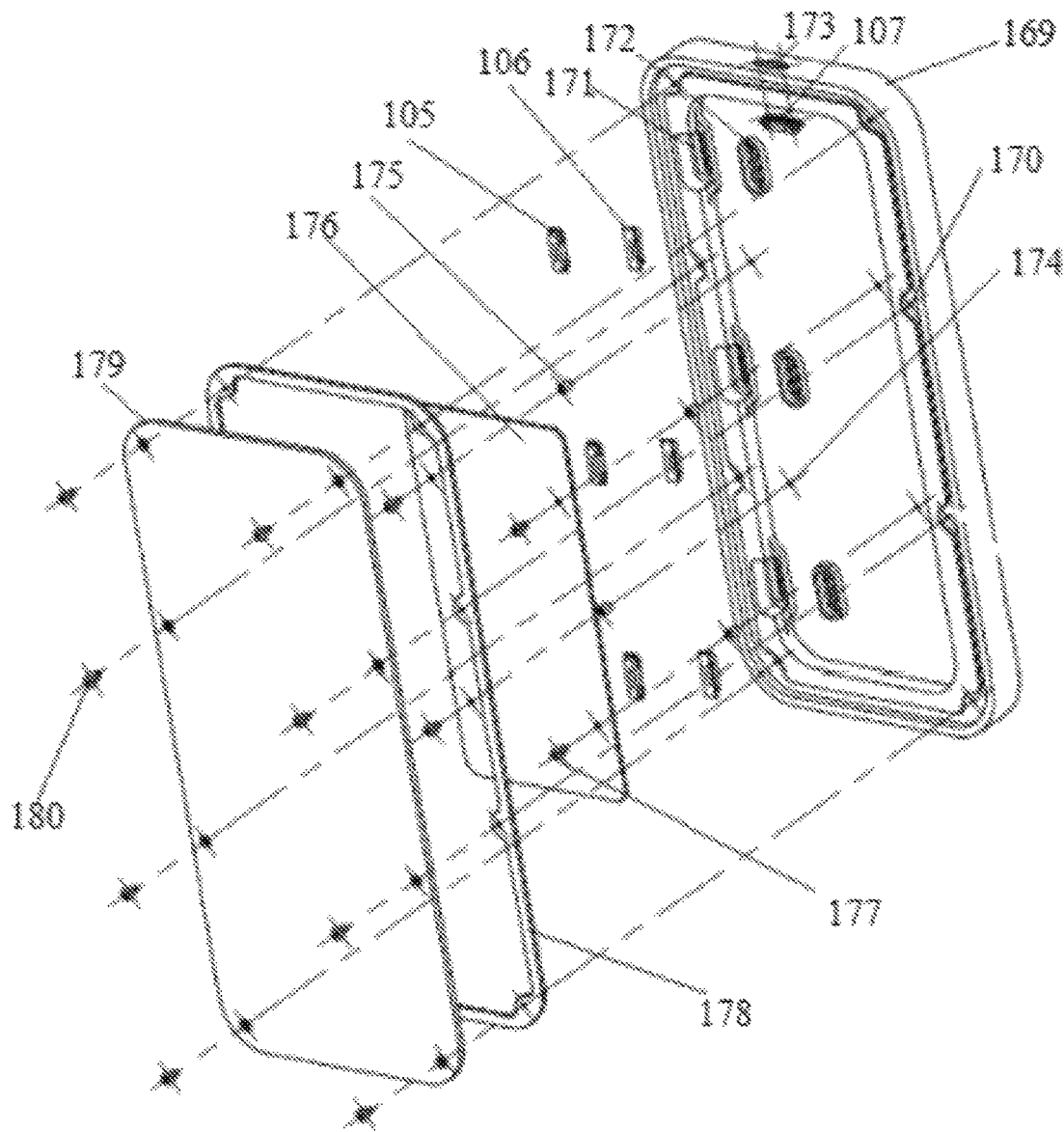
FIG. 3 illustrates an exploded view of chip dock module.

As per an embodiment of the present invention FIG. 3 illustrates an exploded view of chip dock module (104) comprising but not limited to a chip dock housing (169) sealed with some component using bulk thermoset epoxy sealing and epoxy dams at mating points where plurality of male Camera module chip dock Pogo pin-based connector (106) at bulk thermoset epoxy sealing and opening point (172), plurality of external power Pogo pin connector (105) at bulk thermoset epoxy sealing and opening point (171), main chip dock female pogo pin based connector (107) at bulk thermoset epoxy sealing and opening point (173). Epoxy dams are utilized for ensuring inert sealing between two component or part or object, using bulk thermoset epoxy sealing component. Epoxy dams binds the bulk quantity of thermoset epoxy sealing component for providing thick and solid inert sealing after solidification of the thermoset epoxy sealing component. Further, the chip dock module (104) comprises but is not limited to a chip doc module PCB (176) placed in chip dock housing (169) with plurality of chip doc spacers (175) and plurality of chip doc PCB bolts (177) tightened at chip dock housing PCB threaded point (174) with help of thread locking compound. Chip dock module backplate sealing plate (179) is sealed with a chip dock housing gasket slot (170) with the help of elastomeric high-temperature thermoplastic gasket (178) and plurality of rustproof chip dock module backplate sealing plate bolts (180). This plurality of rustproof camera module backplate sealing plate bolts (180) is tightened with thread locking compound.

Figure 4:
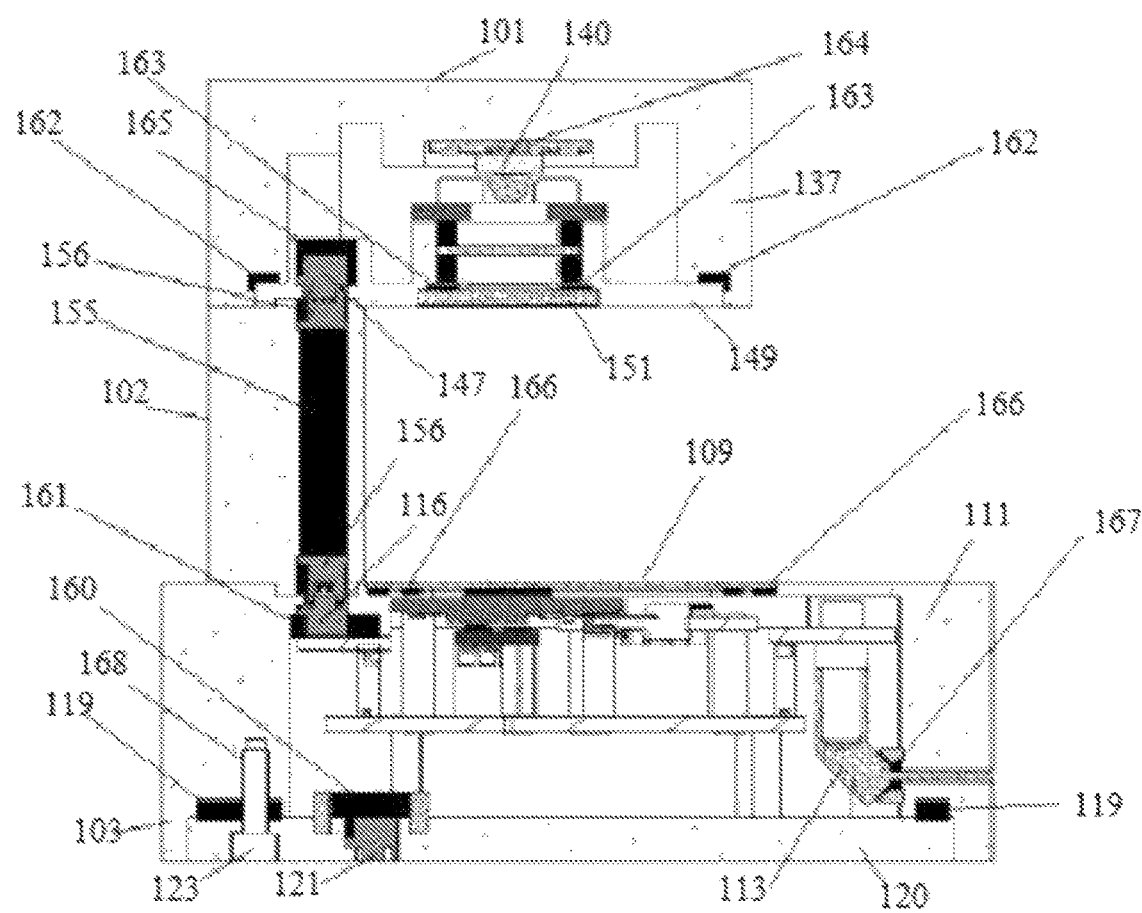
FIG. 4 illustrates the cross sectional view of bulk thermoset epoxy sealing and epoxy dams at mating points.

As per an embodiment of the present invention FIG. 4 illustrates the bulk thermoset epoxy sealing and epoxy dams at mating points and elastomeric high-temperature thermoplastic gasket sealing for a preferred embodiment where a light engine module (101), a sample containing specific module (102) and a camera module (103) are assembled together. Light engine housing (137) is sealed with some component using bulk thermoset epoxy sealing and epoxy dams at mating points where the light source (140) is sealed at bulk thermoset epoxy sealing point (164), light engine housing sealing cap (149) is sealed at bulk thermoset epoxy sealing point (162). Further, a quartz glass window (151) sealed with Light engine housing sealing cap (149) at bulk thermoset epoxy sealing point (163) using bulk thermoset epoxy sealing component, female pogo pin connector (147) is sealed at bulk thermoset epoxy sealing point (165).

Furthermore, the sample containing specific module (102) is sealed with some component using bulk thermoset epoxy sealing and epoxy dams at mating points. The male pogo pin connectors (156) is sealed at bulk thermoset epoxy sealing point (155). The camera housing (111) is sealed using some component with bulk thermoset epoxy sealing and epoxy dams at mating points having scratch-proof viewing glass (109) sealed at bulk thermoset epoxy sealing point (166), the process light indication pipe (113) sealed at bulk thermoset epoxy sealing point (167), the female pogo pin (116) sealed at bulk thermoset epoxy sealing point (161). The camera module backplate sealing plate (120) sealed with some component using bulk thermoset epoxy sealing and epoxy dams at mating points where female camera module with chip dock pogo pin-based connector (121) at bulk thermoset epoxy sealing point (160).

Further, the camera module backplate sealing plate (120) is sealed with camera housing (111) with the help of elastomeric high-temperature thermoplastic gasket (119) and plurality of rustproof camera module backplate sealing plate bolts (123). This plurality of rustproof camera module backplate sealing plate bolts (123) is tightened with thread locking compound (168). The present system has a dens body with zero moving parts inside each module producing a highly vibration isolated microscopic body. In the present invention multitude of sensors are utilized for continuous monitoring of the system component seal. The sensors in combination ensure that the autoclavability of the instrument is maintained and if the sealing breaks even in a minute fashion which is completely invisible to the human eye, the sensors would be able to detect the same. Sensors such as barometric sensors, temperature sensors, humidity sensors, etc. Barometer and humidity sensor together can detect that terrible effect and notify the user.

The Barometric sensors are placed near the meeting or sealing point inside of each module. If the sealing of any modules breaks during high pressure autoclave process or any operating condition, these barometric sensors measure the pressure difference between the atmospheric pressure and the pressure inside the modules. Similarly, temperature sensors are placed inside the modules to measure the heating point during operation. It protects each module from getting over heated. Further, humidity may damage the electronics system present inside of each module for e.g., camera sensor. Due to leakage each module may get humidified due to high pressure sterilizations process, causing fog inside of each module. Temperature sensor and humidity sensor together protect the modules by either notifying the user or switching off the module.

Figure 5:
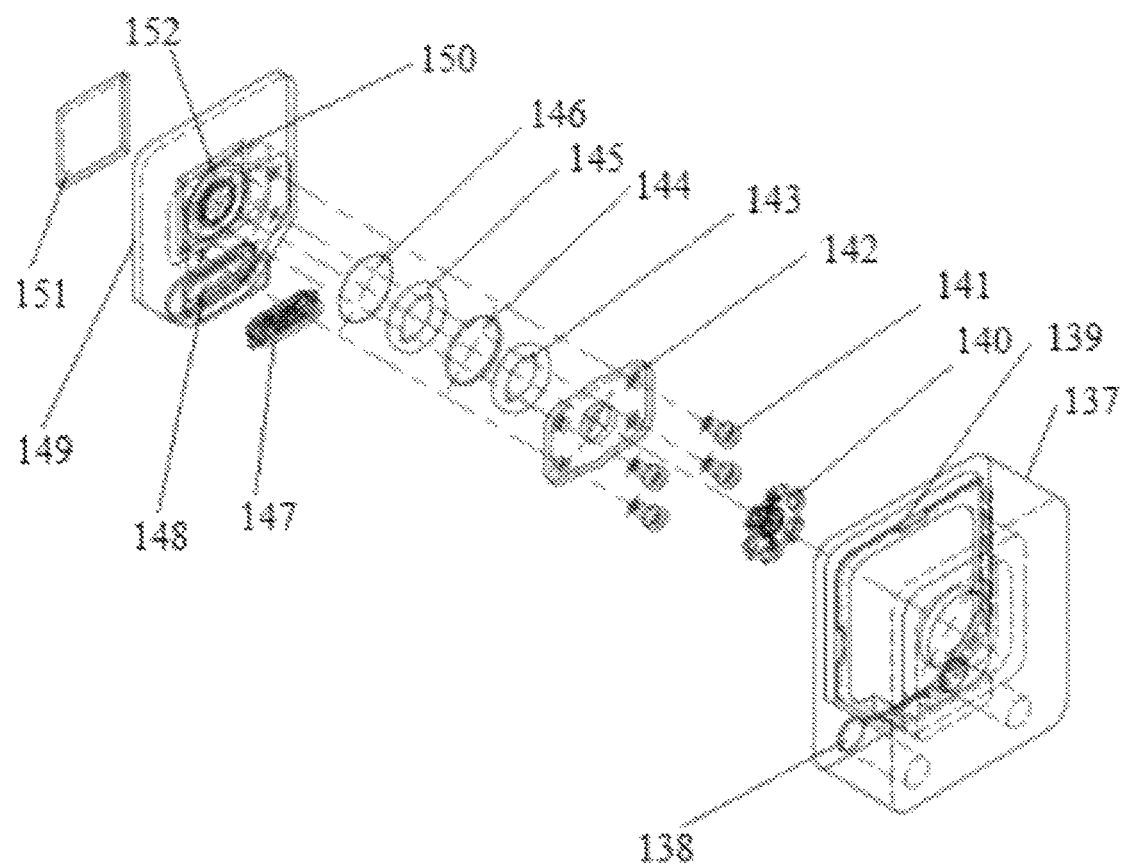
FIG. 5 illustrates an exploded view of light engine module.

As per an embodiment FIG. 5 illustrates an exploded view of light engine module (101) comprising but not limited to a light engine housing (137), a light source (140), a light engine housing sealing cap (149), a quartz glass window (151), a female pogo pin connector (147), a plurality of metal coated on glass pin hole (146), a plurality of metal coated on glass pin hole placing ring (145), a plurality of light diffuser plate (144), a plurality of light diffuser plate placing ring (143), a light engine ring placing cap (142), plurality of light engine ring placing cap bolt's (141). the quartz glass window(151) is sealed with help of bulk thermoset epoxy sealing and epoxy dams at mating points. The female pogo pin connector (147) is sealed with help of bulk thermoset epoxy sealing and epoxy dams at mating point (148).

Further, the plurality of metal is coated on glass pin hole (146), the plurality of metal is coated on glass pin hole placing ring (145), the plurality of light diffuser plate (144), the plurality of light diffuser plate placing ring (143) all are placed sequentially in light engine housing sealing cap (149). A light engine ring placing cap (142) is placed after the sequence and sealed with help of plurality of light engine ring placing cap bolt's (141) and thread locking compound. A light source (140) is placed in light engine housing (137) and electrically connected with female pogo pin connector (147) to gather power from sample containing specific module (102). A guide pillar slot (138) is placed in light engine housing (137) for accurately or perpendicularly connecting sample containing specific module (102) along with the camera module (103). A bulk thermoset epoxy sealing drain (139) is used for sealing of light engine housing sealing cap (149) and pore epoxy dams at mating points.

Figure 6:
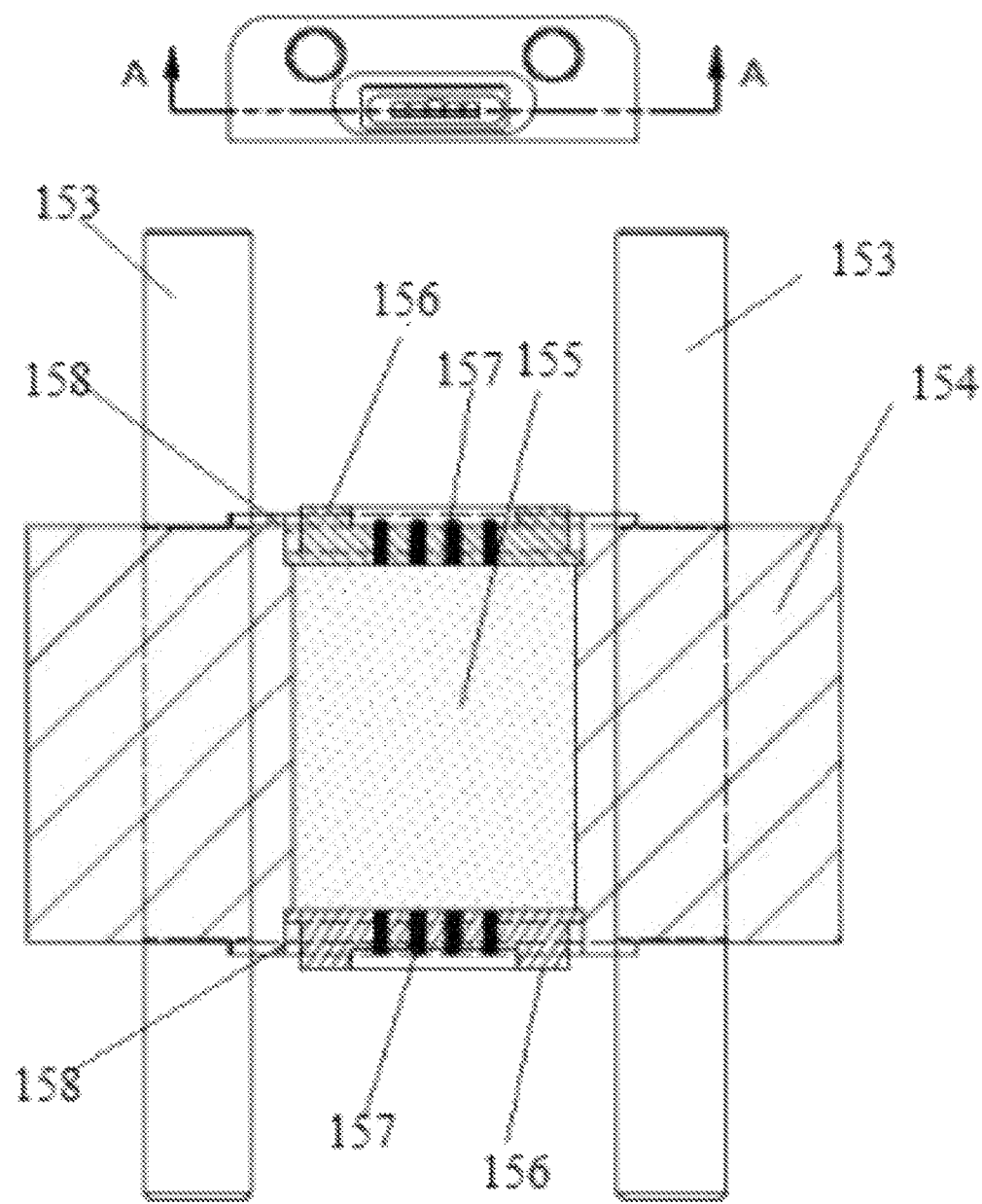
FIG. 6 illustrates the cross sectional view of sample containing specific module.

As per an embodiment FIG. 6 illustrates the cross sectional view of sample containing specific module (102) having fixed with a plurality of guide pillar (153) within the sample containing specific module (102) for connecting all modules together. A solid inert sample containing specific module housing (154) comprise but not limited to plurality of male pogo pin connectors (156) having electrical connectivity pins (157) placed inside and exposed outwards, a pogo pin connectors clearance slots (158) placed for providing clearance when meeting of the light engine module (101) as well as camera module (103). The light engine module (101) as well as camera module (103) also have pogo pins based connectors which may be exposed from the end. For providing complete constrains while meeting of the modules to each other, pogo pin connectors clearance slots (158) are provided. The sample containing specific module (102) may comprise but not limited to at least one humidity sensor, at least one temperature sensor and at least one barometric sensor. A bulk thermoset epoxy sealing (155) is used for sealing sample containing specific module (102) and pore epoxy dams at mating points for electrical waring, plurality of pogo pins. The sample containing specific module (102) may preferably have at least one humidity sensor, at least one temperature sensor and at least one barometric sensor present inside of that sample containing specific module housing (154) where the temperature, humidity, and pressure inside and outside of the sample containing specific module (102) is to be recorded.

Figure 7:
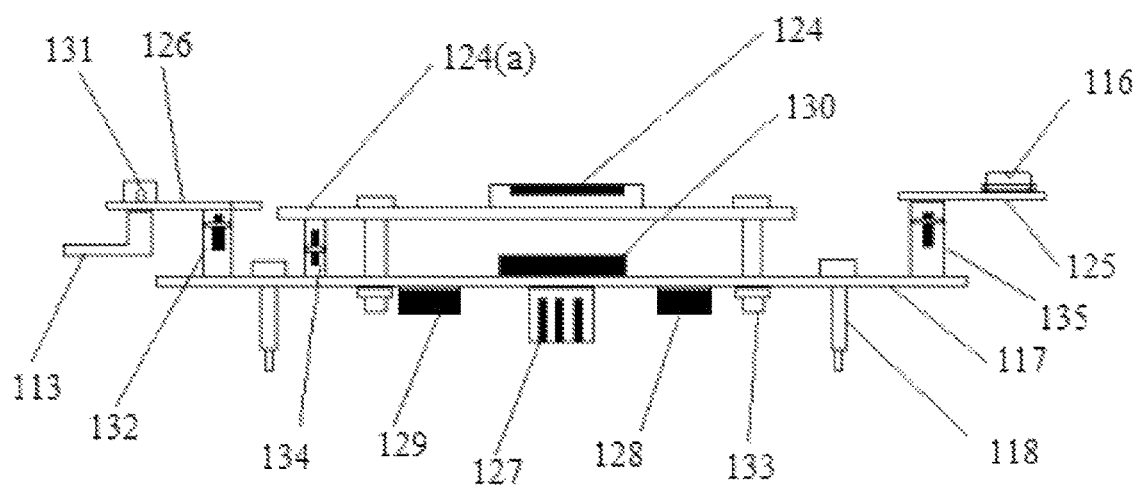
FIG. 7 illustrates the cross-sectional view of printed circuit board (PCB) and electronics module.

As per an embodiment FIG. 7 illustrates the printed circuit board (PCB) and electronics module (136) present inside of the camera module (103). A process light indication pipe (113) is mounted on process light indication PCB (126) having a RGB led light source (131) which is used for knowing the status of the system while operating by emitting different wavelengths of light. The process light indication PCB (126) module connected with mother PCB (117) with a plurality of electrical connector (132). A female pogo pin (116) is mounted on pogo pin PCB (125) and connected with mother PCB (117) with a plurality of electrical connector (135). At least one camera sensor (124) is mounted on the camera sensor PCB (24a) which is electrically connected with the mother PCB (117) with plurality of electrical connector (134) and positional connected with PCB spacers (133). At least one humidity sensor (128), at least one temperature sensor (129), and at least one barometric sensor (130) is placed on the mother PCB (117). A plurality of mother PCB electrical connector (127) is placed in mother PCB (117) for the supply of power and signal from a female camera module chip dock Pogo pin-based connector (121) placed in camera module backplate sealing plate (120). The mother PCB (117) is positional connected with the camera module backplate sealing plate (120) with help of a plurality of PCB spacers (118).

Figure 8:
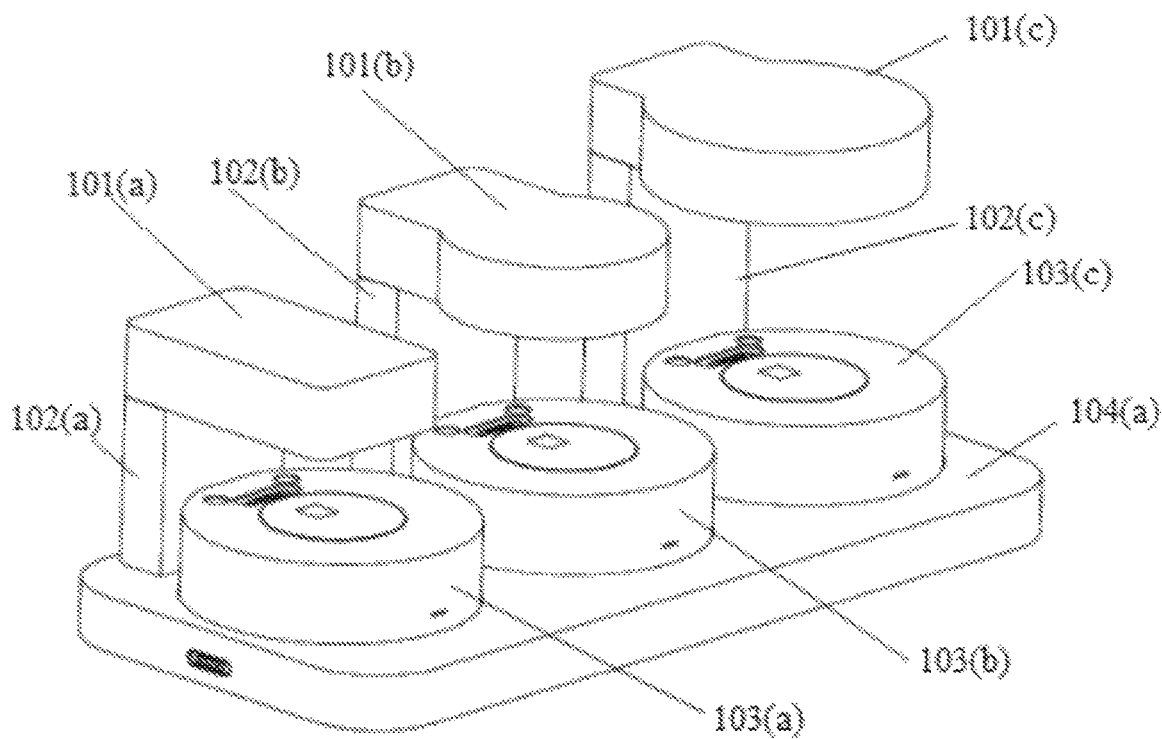
FIG. 8 illustrates the exploded view of the individual modules.

As per an embodiment FIG. 8 illustrates the exploded view of the individual modules connected with pogo pin-based external power supply port (105) for different light engine modules and sample containing specific module for supplying high power for the individual light engine modules as per requirement. Also, different camera modules comprising individual sensors, can be placed on a modular chip dock module for acquiring individual quality images. As per user requirement camera module, light engine modules, and sample containing specific module can be replaceable. Further, specific modules have different samples of varying lengths and different light engine modules having different features but are not limited to wavelength, light intensity, aperture, shape and design, etc. Further, the plurality of camera module (103) having camera module (103a), camera module (103b) and camera module (103c) are mounted on chip dock (104a) and plurality of sample containing specific module having of sample containing specific module (102a), sample containing specific module (102b) and sample containing specific module (102c) are connected with pogo pin-based external power supply port (105) for supplying power to plurality light engine module (101) having light engine module (101a), light engine module (101b) and light engine module (101c) respectively.

Figure 9:
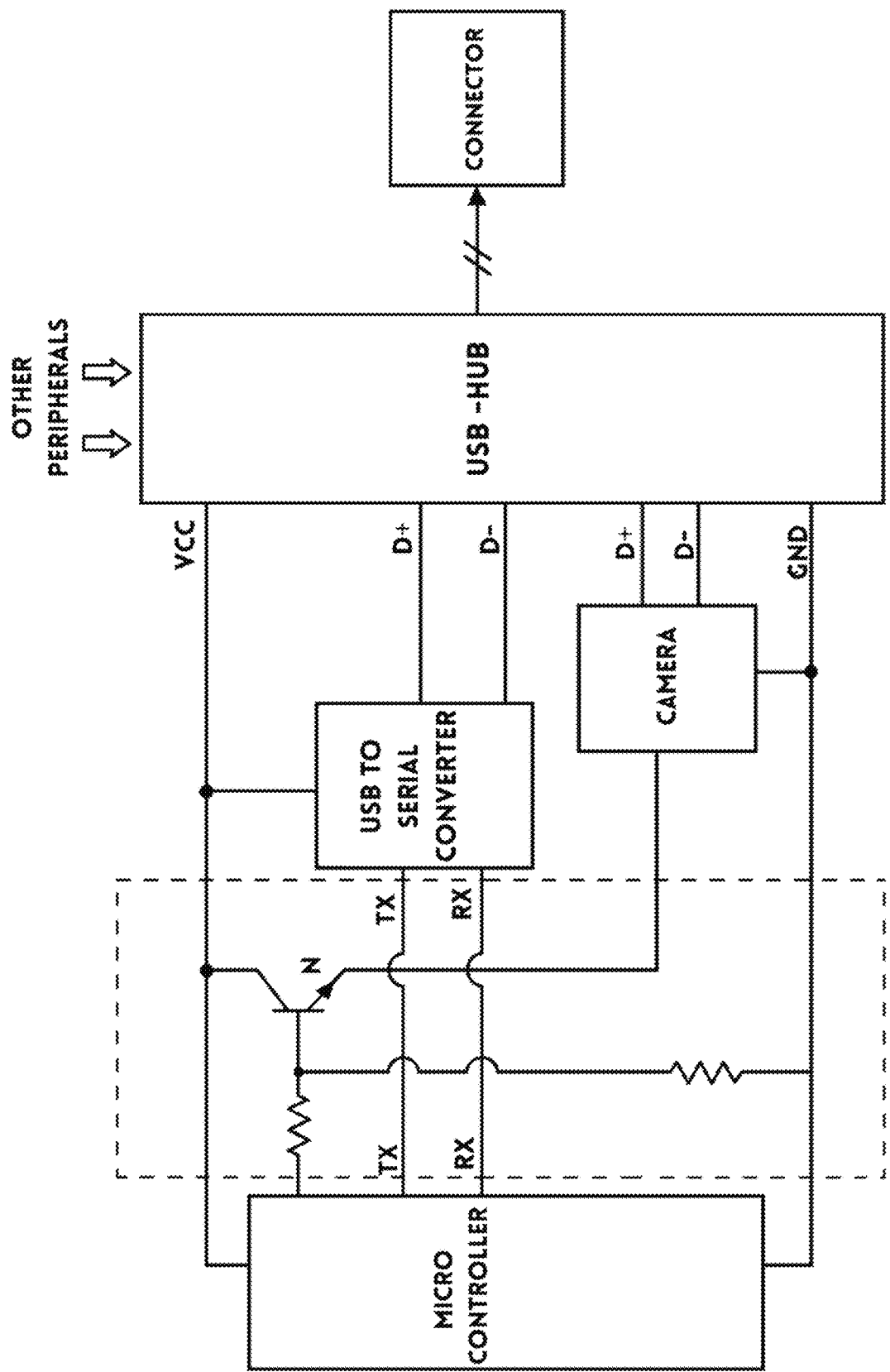
FIG. 9 illustrates the circuit diagram of the lens less imaging microscopy system.

As per an exemplary embodiment of the present invention FIG. 9 illustrates a circuit diagram of the lens less imaging system wherein a microcontroller (150), the camera sensor (124), a USB to serial converter (152), a conventional NPN transistor (159), a current limiting resistor (187), a pull down resistor (186), a USB multiport hub controller (185) and a female Camera module Chip Dock Pogo Pin-Based Connector (121) are all functionally connected. The camera sensor (124) is connected with a microcontroller (150) through a conventional NPN transistor (159). Further, the USB to serial converter (152) connects the microcontroller (150) with USB multiport hub controller (185). This USB multiport hub controller (185) is further connected to a female Camera module chip dock magnetic interconnector (121).

As illustrated in FIG. 9 the circuit diagram represents the lens less imaging system wherein the connection of NPN transistor (159) is utilized for switching ON/OFF the digital switch on the power line for controlling the camera sensor (124) operation through a general purpose I/O port of the microcontroller (150). The NPN transistor (159) is also connected with the pull down resistor and the current limiting resistor to avoid floating voltage output. For the microcontroller (150) to communicate with other peripherals as well as the female Camera module chip dock magnetic connector (121), a USB to serial converter (152) is used. The USB multiport hub controller (185) is used for accumulating and establishing connection between other peripherals, female Camera module chip dock magnetic connector (121), microcontroller (150), USB to serial converter (152) and camera sensor (124).

The USB multiport hub controller's (185) Vcc and GND are connected to the microcontroller (150) for receiving power. Further, Rx and Tx of the microcontroller (150) are connected with USB to serial converter (152) for exchanging signal between the conventional NPN transistor (159) and camera sensor (124) for switching it on and off. Further the NPN transistor (159) is also connected with the Vcc of the USB multiport hub controller (185) at one end whereas the other end is connected with camera sensor (124). The camera sensor (124) is further connected with USB multiport hub controller (185) through the serial data connector (D+) and (D−) port. While another end of the camera sensor (124) is also connected with USB multiport hub controller (185) through GND port. The USB to serial converter (152) is also connected with the USB multiport hub controller (185) through the (D+) and (D−) for serial data connection. The USB multiport hub controller (185) is accruing power and signals from the female Camera module chip dock magnetic connector (121) for distributing power and signal of the electronic peripherals.

Figure 10:
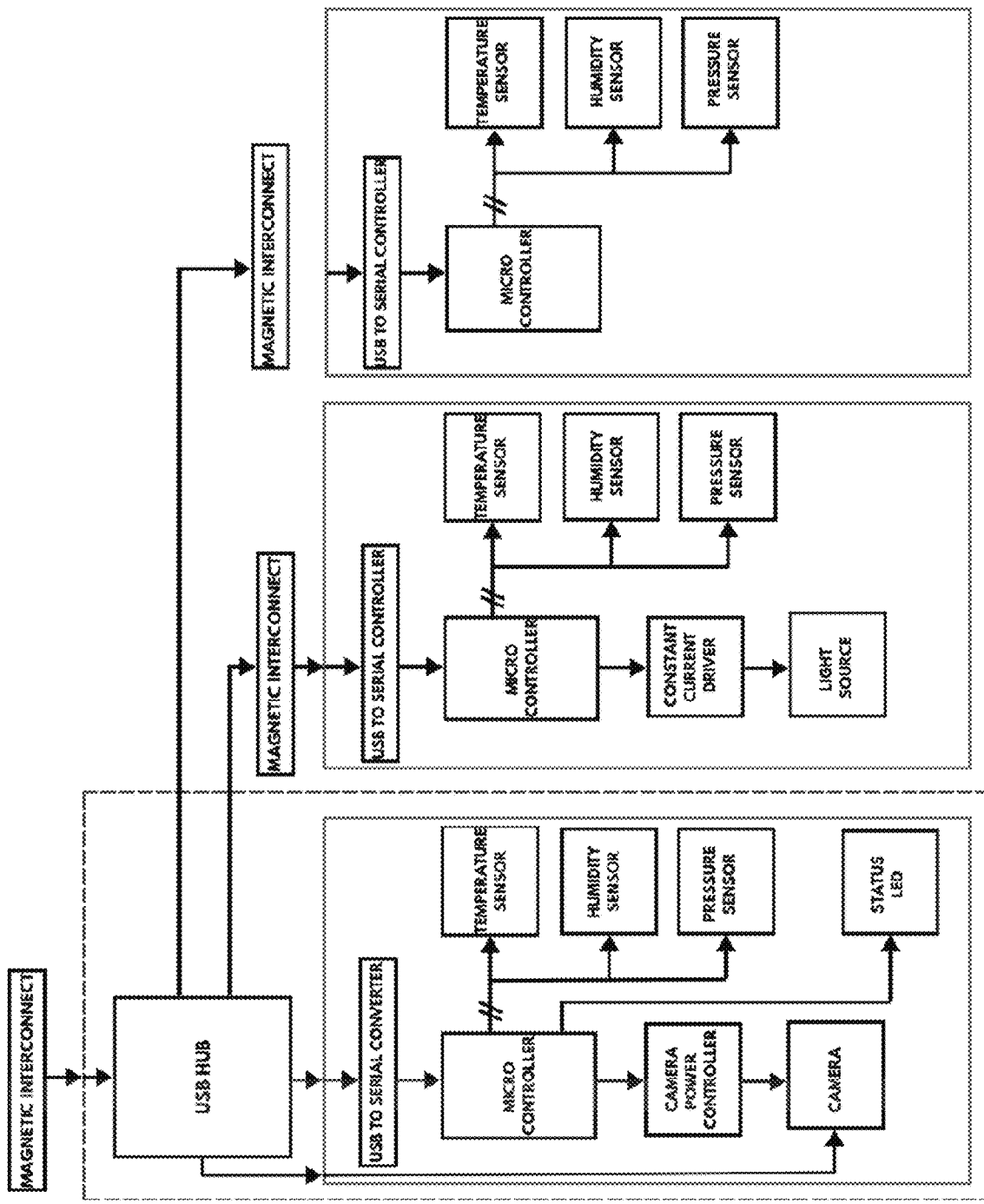
FIG. 10 illustrates the working of the lens less imaging microscopy system.

FIG. 10 illustrates the working of the lens less imaging system of the present invention. The working of the present invention comprises of the following steps:

connecting USB multiport hub controller (185) with the female Camera module Chip Dock Pogo Pin-Based Connector (121);

connecting microcontroller (150) with USB multiport hub controller (185) through a USB to serial converter (152);

connecting the microcontroller (150) with camera sensor (124) through NPN transistor (159);

switching ON the camera sensor (124) through the microcontroller (150) connected via the NPN transistor (159);

acquiring an image through the camera sensor (124);

switching OFF the camera sensor (124) through the microcontroller (150) connected via the NPN transistor (159);

evaluating the rise in temperature through the temperature sensor to maintain normal functioning of the camera sensor (124);

evaluating the difference between atmospheric pressure and the pressure inside the modules through barometric sensor to confirm the epoxy sealing is sealed;

evaluating the rise in humidity inside the module through humidity sensor to evaluate if there is any formation of fog on the camera sensor;

repeating the procedure for functioning of the camera sensor (124) for capturing images.

Figure 11:
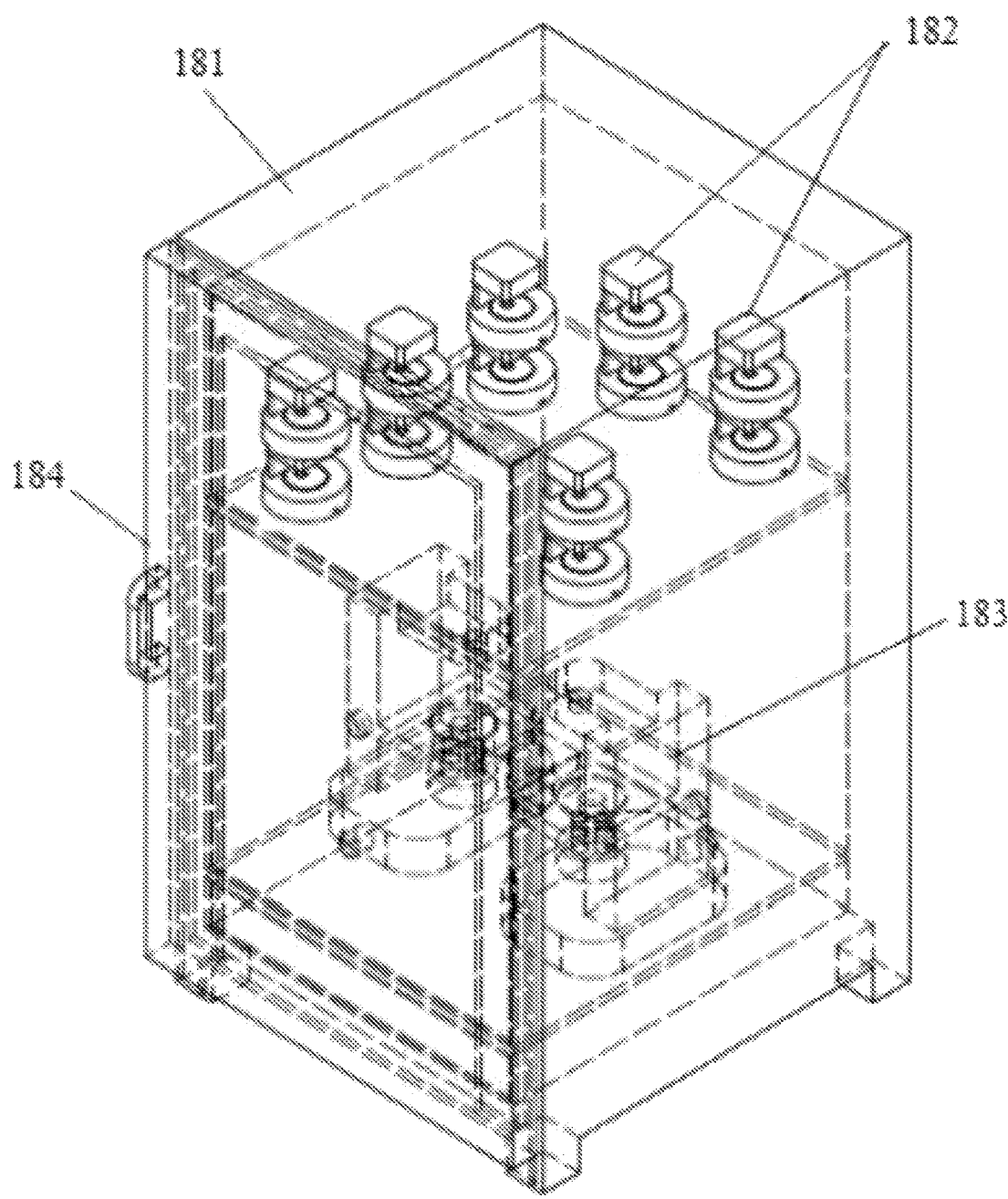
FIG. 11 illustrates the perspective view of arrangement of conventional incubator-microscope with respect to Modular & Autoclave-able Lens Less Imaging System of the present invention.

As per an embodiment FIG. 11 illustrates the comparison between conventional incubator-microscope (183) with our Modular & Autoclave-able Lens Less Imaging System (182) consuming space inside of an incubation system (181). Conventional incubator-microscope (183) utilizes much more space inside of an incubation system (181) whereas the present invention i.e., Modular & Autoclave-able lens less imaging system (182) consumes less space and can be stack multiple pieces one after another. Opening of the incubation door (184).

Figure 12:
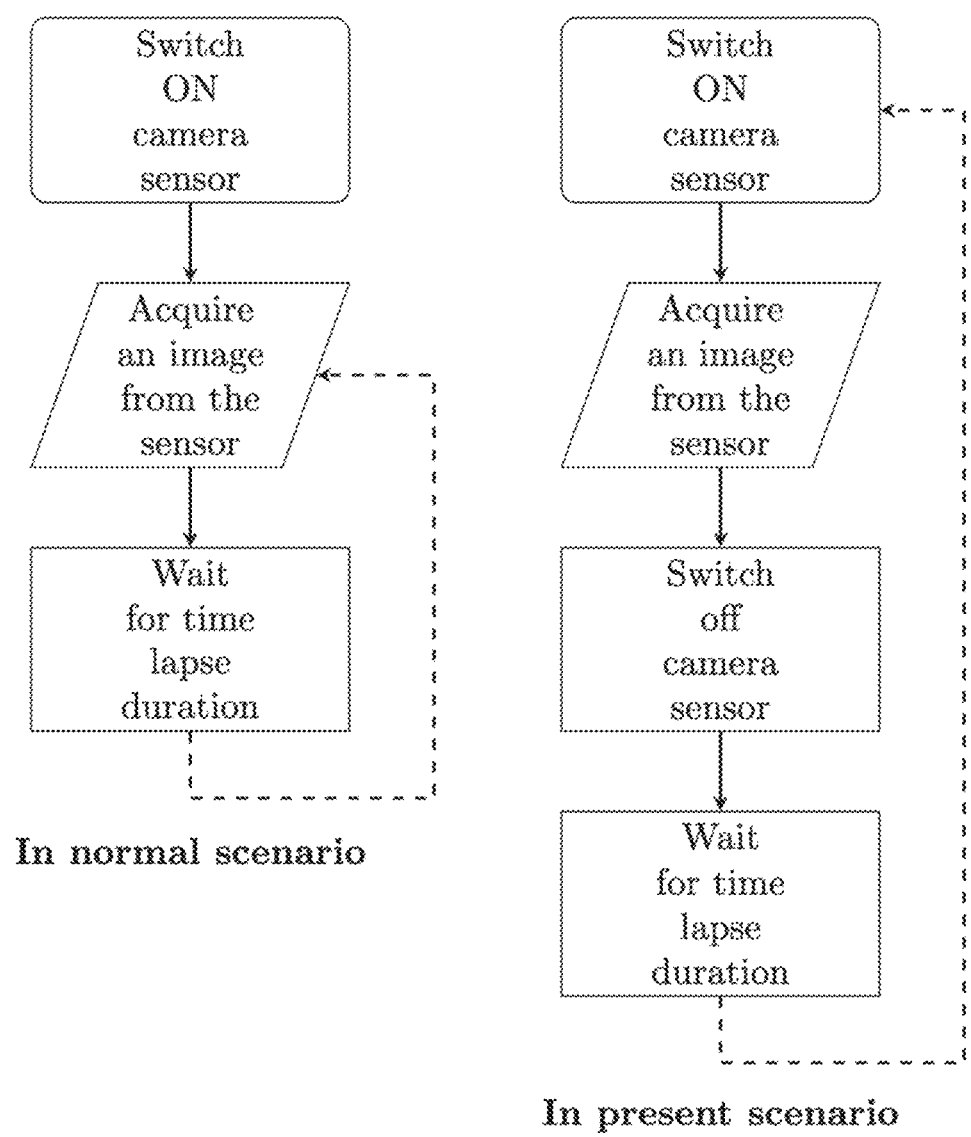
FIG. 12 illustrates the flowchart representing the difference in working of the present invention with respect to the conventional method.

As per an embodiment FIG. 12 illustrates the difference in working of the present invention with respect to the conventional method. The modular & autoclave-able lens less imaging system of the present invention comprises at least one camera sensor placed inside the camera module (103). This camera sensor module heats up when the power is supplied to it. In a normal scenario when we switch ON the sensor it starts heating, then afterwards we acquire an image from that sensor and wait for the time-lapse duration for acquiring an image from that sensor and the same process id repeated afterwards. During that whole cycle, the sensor is always switched on and in turn it gets heated. So as to cool down the sensor a heat sink, cooling fan, or any other cooling component are utilized which additionally provides a complicated and larger design of the system. Further, sometimes uncontrolled heat conduction and heat convection may not be support inside the system or heat transfer may take place directly through the sample and thereby heating the sample also. However, the present invention provides an efficient method of utilizing the system comprises the following steps:

switching on the camera sensor and heating it up;

acquiring an image from the camera sensor;

switching off the camera sensor;

waiting for the time-lapse duration;

automatic switching on the camera sensor for next cycle.

In the above mentioned process for example if the time-lapse duration is 10 seconds. After 10 seconds the camera sensor again switches on and repeats that cycle again and again. The method refrains the sensor from heating and a complicated and larger design to control heat conduction and heat convection inside of the body is not at all needed, and heat transfer does not take place directly through the sample, therefore, the sample is also secured.

In the present invention number of mating parts are minimized and are making external surface as smooth as possible with minimal features as possible, in order to minimize micro niches, clotting of microorganism, to enhanced cleanability and serializability of the product. No tolerance pigments or paint are utilized in order to produce an external surface that would last long in time without developing surface defects.

As per an embodiment of the present invention the lens less imaging system, other than the electronic and mechanical parts, also includes a software unit that allows recognition of attachments and detachments of the various modules & also sensing of working environment.

As per an embodiment the advantages of the system of the present invention are:
- With lens less imaging system scientific exploration and commercial utilization of 3 dimensional microscopy of cells, microorganisms and other micro metric artifacts within a sterile environment is more accessible;
- The present system sets new benchmarks for ease of use, reliability, and affordability.
- The lens less imaging system of present invention provides two dimensional and three dimensional microscopy of cells, microorganisms and other micro metric artifacts within a sterile environment for a much larger application, such as, for Biotech laboratories, institutes, research groups, universities and startups.
- The lens less imaging system of the present invention focuses on simplicity of the instrument, low cost, easy to handle, and most importantly being modular while also making sure there are no performance trade-offs made.
- The present lens less imaging system also has higher flexibility and affordability due to the swappable modules.
- The present system also takes care of all the data, security and complexity concerns arising in the existing systems.
- Without use of any Fan or any active cooling the temperature of the camera sensor is maintained well below the temperature inside in an incubator using a specialized power management circuitry.
- This lens less microscope of the present invention is stackable while it allows the user to utilize incubator space much more efficiently.
- In the present invention number of mating parts are minimized and are making external surface as smooth as possible with minimal features as possible, in order to minimize micro niches, clotting of microorganism, to enhanced cleanability and serializability of the product.
- No tolerance pigments or paint are utilized in order to produce an external surface that would last long in time without developing surface defects,
- The present invention provides compact and rigid body with zero moving parts inside each module producing a high vibration-isolated microscopic body.

As per an embodiment reference numeral with respect to the components of the system of the present invention as illustrated in FIGS. 1 to 9 are enlisted in the Table 1 below:

| S. No. | Reference Numeral | Component of the System |
|---|---|---|
| 1. | 101 | Light Engine Module |
| 2. | 102 | Sample Containing Specific Module |
| 3. | 103 | Camera Module |
| 4. | 104 | Chip Dock |
| 5. | 105 | External Power Pogo Pin Connector |
| 6. | 106 | Male Camera module chip dock Pogo pin-based connector |
| 7. | 107 | Main Chip Dock Female Pogo Pin Based Connector |
| 8. | 108 | Sensor Viewing Window |
| 9. | 109 | A Scratchproof Viewing Glass |
| 10. | 110 | Process Indication Light Window |
| 11. | 111 | Anti-Microbial And Anti-Bacterial Surface-Treated Camera Housing |
| 12. | 112 | Camera Module Gasket Slot |
| 13. | 113 | Process Light Indication Pipe |
| 14. | 114 | Camera Module Opening Window |
| 15. | 115 | An Opening |
| 16. | 116 | Female 4 Pin Pogo Pin |
| 17. | 117 | Mother PCB |
| 18. | 118 | Plurality Of PCB Spacers |
| 19. | 119 | Elastomeric High-Temperature Thermoplastic Gasket |
| 20. | 120 | Camera Module Backplate Sealing Plate |
| 21. | 121 | a female Camera module chip dock Pogo pin-based connector |
| 22. | 122 | Camera Module Backplate Sealing Plate Washers |
| 23. | 123 | Camera Module Backplate Sealing Plate Bolts |
| 24. | 124 | One Camera Sensor |
| 25. | 125 | Pogo Pin PCB |
| 26. | 126 | Process Light Indication PCB |
| 27. | 127 | PCB Electrical Connector |
| 28. | 128 | At Least One Humidity Sensor |
| 29. | 129 | One Temperature Sensor |
| 30. | 130 | At Least One Barometric Sensor |
| 31. | 131 | RGB Led Light Source |
| 32. | 132 | Elastomeric High-Temperature Thermoplastic Gasket |
| 33. | 133 | Camera Module Backplate Sealing Plate |
| 34. | 134 | Chip Dock Pogo Pin-Based Connector |
| 35. | 135 | Camera Module Backplate Sealing Plate Washers |
| 36. | 136 | Camera Module Backplate Sealing Plate Bolts |
| 37. | 137 | One Camera Sensor |
| 38. | 138 | Pogo Pin PCB |
| 39. | 139 | Process Light Indication PCB |
| 40. | 140 | PCB Electrical Connector |
| 41. | 141 | At Least One Humidity Sensor |
| 42. | 142 | One Temperature Sensor |
| 43. | 143 | At Least One Barometric Sensor |
| 44. | 144 | RGB Led Light Source |
| 45. | 145 | Plurality Of Electrical Connector |
| 46. | 146 | PCB Spacers |
| 47. | 147 | Plurality Of Electrical Connector |
| 48. | 148 | Plurality Of Electrical Connector |
| 49. | 149 | Light Engine Housing Sealing Cap |
| 50. | 150 | Microcontroller |
| 51. | 151 | Quartz Glass Window |
| 52. | 152 | USB to serial converter |
| 53. | 153 | Guide Pillar |
| 54. | 154 | Specific Module Housing |
| 55. | 155 | Bulk Thermoset Epoxy Sealing |
| 56. | 156 | Male Pogo Pin Connectors |
| 57. | 157 | Electrical Connectivity Pins |
| 58. | 158 | Pogo Pin Connectors Clearance Slots |
| 59. | 159 | NPN transistor |
| 60. | 160 | Bulk Thermoset Epoxy Sealing Point |
| 61. | 161 | Bulk Thermoset Epoxy Sealing Point |
| 62. | 162 | Bulk Thermoset Epoxy Sealing Point |
| 63. | 163 | Bulk Thermoset Epoxy Sealing Point |
| 64. | 164 | Bulk Thermoset Epoxy Sealing Point |
| 65. | 165 | Bulk Thermoset Epoxy Sealing Point |
| 66. | 166 | Bulk Thermoset Epoxy Sealing Point |
| 67. | 167 | Bulk Thermoset Epoxy Sealing Point |

| S. No. | Reference Numeral | Component of the System |
|---|---|---|
| 68. | 168 | Thread Locking Compound |
| 69. | 169 | Chip Dock Housing |
| 70. | 170 | Chip Dock Housing Gasket Slot |
| 71. | 171 | Bulk Thermoset Epoxy Sealing And Opening Point |
| 72. | 172 | Bulk Thermoset Epoxy Sealing And Opening Point |
| 73. | 173 | Bulk Thermoset Epoxy Sealing And Opening Point |
| 74. | 174 | PCB Threaded Point |
| 75. | 175 | Plurality Of Chip Doc Spacers |
| 76. | 176 | Chip Doc Module PCB |
| 77. | 177 | Plurality Of Chip Doc PCB Bolts |
| 78. | 178 | Elastomeric High-Temperature Thermoplastic Gasket |
| 79. | 179 | Chip Dock Module Backplate Sealing Plate |
| 80. | 180 | Backplate Sealing Plate Bolts |
| 81. | 181 | Incubation System |
| 82. | 182 | Modular & Autoclave-Able Lens Less Imaging System |
| 83. | 183 | Conventional Incubator-Microscope |
| 84. | 184 | Opening Of The Incubation Door |
| 85. | 185 | USB multiport hub controller |
| 86. | 186 | Pull down resistor |
| 87. | 187 | Current limiting resistor |

While this invention has been described in connection with what is presently considered to be the most practical and preferred embodiment, it is to be understood that the invention is not limited to the disclosed embodiments, but, on the contrary, is intended to cover various modifications and equivalent arrangements included within the scope of the appended claims.

We claim:

1. A lens less imaging microscopy system comprising:
   a) a plurality of microscopes;
   b) a plurality of modules; and
   c) a plurality of sensors comprising at least one camera sensor; at least one pressure sensor; at least one humidity sensor; at least one temperature sensor; and at least one barometric sensor,
   wherein
   the plurality of modules are swappable and autoclavable, and comprise:
   a plurality of light engine modules (101);
   a plurality of sample containing specific modules (102);
   a plurality of camera modules (103);
   a chip dock module (104); and
   an electronic module (136),
   the plurality of light engine modules (101), the plurality of sample containing specific modules (102), and the plurality of camera modules (103) are mounted on the chip dock module (104) via Pogo pin-based connectors, and
   the at least one camera sensor, is automatically powered on during operation and powered off when not in use.

2. The lens less imaging microscopy system as claimed in claim 1, wherein each of the plurality of light engine modules (101) comprises an LED with coherent light source generator with different wavelength for each light engine module (101).

3. The lens less imaging microscopy system as claimed in claim 1, wherein each of the plurality of camera modules (103) comprises an anti-microbial and anti-bacterial external surface.

4. The lens less imaging microscopy system as claimed in claim 1, wherein the lens less imaging microscopy system is designed for 2-dimensional or 3-dimensional microscopy of one or more of cells, microorganisms, and other micro metric artifacts within a sterile environment.

5. The lens less imaging microscopy system as claimed in claim 1, wherein the lens less imaging microscopy system comprises a power management circuitry to maintain temperature of the at least one camera sensor.

6. The lens less imaging microscopy system as claimed in claim 1, wherein a unibody design of the lens less imaging microscopy system uses bulk thermoset epoxy seals to seal the plurality of modules with epoxy dams at mating points.

7. The lens less imaging microscopy system as claimed in claim 1, wherein sealing of the lens less imaging microscopy system is enabled by a magnetic pogo pin-based connector of thermoset plastic.

8. The lens less imaging microscopy system as claimed in claim 1, wherein the lens less imaging microscopy system comprises electrical contact pins made of one or more rust less metals such as brass, gold.

9. The lens less imaging microscopy system as claimed in claim 1, wherein the lens less imaging microscopy system is secured with a thread locking compound and elastomeric high-temperature thermoplastic gaskets.

10. The lens less imaging microscopy system as claimed in claim 1, wherein a thermoplastic elastomeric gaskets are used on the plurality of light engine modules to eliminate frosting of glass.

11. The lens less imaging microscopy system as claimed in claim 1, wherein a plurality of silica gel beads container bags de-humidifies electronic circuitry and the plurality of modules in the lens less imaging microscopy system.

12. The lens less imaging microscopy system as claimed in claim 1, wherein the plurality of sensors continuously monitor seal and autoclavability of the plurality of modules.

13. The lens less imaging microscopy system as claimed in claim 1, wherein the lens less imaging microscopy system is designed to be stackable when in operation.

14. The lens less imaging microscopy system as claimed in claim 1, wherein the lens less imaging microscopy system comprises zero moving parts inside each of the plurality of modules.

15. A method for operating the lens less imaging microscopy system as claimed in claim 1, comprises the following steps:
   a) switching ON the at least one camera sensor (124) through a microcontroller (150) connected to the at least one camera sensor (124) via an NPN transistor (159);
   b) acquiring an image through the at least one camera sensor (124);
   c) switching OFF the at least one camera sensor (124) through the microcontroller (150) connected via the NPN transistor (159);
   d) evaluating rise in temperature through the at least one temperature sensor to maintain normal functioning of the at least one camera sensor (124);
   e) evaluating a difference between atmospheric pressure and pressure inside the plurality of modules through the at least one barometric sensor to confirm that an epoxy sealing utilized to seal the plurality of modules is sealed;
   f) evaluating rise in humidity inside the plurality of modules through the at least one humidity sensor to evaluate if there is formation of fog on the at least one camera sensor (124); and
   g) repeating the procedure for functioning of the at least one camera sensor (124) to capture images.

16. The method as claimed in claim 15, wherein the microcontroller (150) is connected to a USB multiport hub controller (185) through a USB to serial converter (152) and the USB multiport hub controller (185) is connected with a female Camera module Chip Dock Pogo Pin-Based Connector (121).

17. The method as claimed in claim 15, wherein switching on/off of the at least one camera sensor (124) is mediated by the microcontroller (150) through the NPN transistor (159).

\* \* \* \* \*